(12) United States Patent
Arichandrapandian et al.

(10) Patent No.: US 12,174,728 B2
(45) Date of Patent: Dec. 24, 2024

(54) SYSTEM FOR IMPLEMENTING A CODE DEBUGGER PLATFORM IN A VIRTUAL ENVIRONMENT

(71) Applicant: BANK OF AMERICA CORPORATION, Charlotte, NC (US)

(72) Inventors: Thangaselvi Arichandrapandian, Chennai (IN); Prachi Bhupendra Chaudhari, Maharashtra (IN); Rutuja Raju Gujare, Karnataka (IN); Abhijit Kedar, Maharashtra (IN); Charlotte Pinto, Maharashtra (IN); Drishti Debashish Roy, Maharashtra (IN); Sahil Bipinbhai Shah, Maharashtra (IN); Siddharth Vaid, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 98 days.

(21) Appl. No.: 18/131,063

(22) Filed: Apr. 5, 2023

(65) Prior Publication Data
US 2024/0338300 A1 Oct. 10, 2024

(51) Int. Cl.
*G06F 11/36* (2006.01)
*G06F 40/40* (2020.01)

(52) U.S. Cl.
CPC ...... *G06F 11/3664* (2013.01); *G06F 11/3656* (2013.01); *G06F 40/40* (2020.01)

(58) Field of Classification Search
None
See application file for complete search history.

(56) References Cited

U.S. PATENT DOCUMENTS

| 6,158,045 | A | 12/2000 | You | |
|---|---|---|---|---|
| 7,350,194 | B1 * | 3/2008 | Alpern | G06F 11/362 717/124 |
| 8,087,002 | B2 | 12/2011 | Fjeldstad et al. | |
| 8,336,029 | B1 * | 12/2012 | McFadden | G06F 9/45516 717/124 |
| 8,533,610 | B2 | 9/2013 | Fujioka | |
| 8,639,984 | B2 * | 1/2014 | McNeeney | G06F 11/1484 714/38.1 |

(Continued)

FOREIGN PATENT DOCUMENTS

CN 112527571 A * 3/2021 .......... G06F 11/2236

*Primary Examiner* — Philip Wang
(74) *Attorney, Agent, or Firm* — Moore & Van Allen PLLC; Andrew T. Wood (57) ABSTRACT

Systems, computer program products, and methods are described herein for implementing a code debugger platform in a virtual environment. The system is configured to authenticate a plurality of users via an authentication portal and initialize an instance of a virtual environment for each of the plurality of users. The system is configured to extract a plurality of computer instructions, and display, in the virtual environment, a debugging platform of an integrated development environment, the debugging platform configured to receive the plurality of computer instructions and receive input from at least one of the plurality of users, and initiate a debugging protocol. The debugging protocol may include a breakpoint in at least one of the plurality of computer instructions, wherein the breakpoint is received as an input from the at least one of the plurality of users.

20 Claims, 5 Drawing Sheets

(56) References Cited

U.S. PATENT DOCUMENTS

| | | | |
|---|---|---|---|
| 8,782,615 B2 | 7/2014 | Kollberg et al. | |
| 8,990,707 B2 | 3/2015 | Jones et al. | |
| 9,690,686 B1* | 6/2017 | Wilmot | G06F 9/455 |
| 9,703,678 B2* | 7/2017 | Stall | G06F 11/3664 |
| 10,846,197 B1* | 11/2020 | Bluestein | G06F 11/3624 |
| 11,227,439 B2 | 1/2022 | Bridgeman et al. | |
| 2009/0222646 A1* | 9/2009 | Ohba | G06F 11/3636 |
| | | | 712/E9.082 |
| 2010/0227682 A1 | 9/2010 | Reville et al. | |
| 2011/0107239 A1 | 5/2011 | Adoni et al. | |
| 2012/0102469 A1* | 4/2012 | Kapoor | G06F 11/362 |
| | | | 717/129 |
| 2013/0086424 A1* | 4/2013 | Smiljanic | G06F 11/3664 |
| | | | 714/E11.178 |
| 2018/0176106 A1* | 6/2018 | Raney | H04L 43/20 |
| 2018/0367422 A1* | 12/2018 | Raney | H04L 43/062 |
| 2020/0310942 A1* | 10/2020 | Nelson | G06F 11/3636 |
| 2020/0319993 A1* | 10/2020 | Hong | G06F 11/3624 |
| 2020/0401381 A1 | 12/2020 | Carter et al. | |
| 2022/0050704 A1 | 2/2022 | Moore et al. | |
| 2022/0329569 A1 | 10/2022 | Chen | |
| 2022/0351048 A1 | 11/2022 | Collins | |
| 2024/0004780 A1* | 1/2024 | Boyd | G06F 11/362 |

* cited by examiner

SYSTEM FOR IMPLEMENTING A CODE DEBUGGER PLATFORM IN A VIRTUAL ENVIRONMENT

FIELD OF THE INVENTION

The present invention embraces a system for implementing a code debugger platform in a virtual environment.

BACKGROUND

Current platforms for debugging computer instructions are challenging to manage for complex logic or workflows since the current debugging platforms can only debug one application, or portion of an application, at a time. Further, collaborations between users associated with the entity is challenging, since each user is oftentimes isolated to debugging a particular portion of computer instructions without insight into the status(es) of debugging occurring on other portions of the computer instructions, since users associated with the entity often work in isolation. The current solutions for debugging are time-consuming and constrain resources. Accordingly, there is a need for a system and method for implementing a code debugger platform in a virtual environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing a code debugger platform in a virtual environment is presented. The system may include at least one non-transitory storage device, and at least one processing device coupled to the at least one non-transitory storage device, wherein the at least one processing device is configured to authenticate a plurality of users via an authentication portal, initialize an instance of a virtual environment for each of the plurality of users, extract, from the at least one non-transitory storage device, a plurality of computer instructions, wherein the plurality of computer instructions may include interconnectivity therebetween, and wherein the plurality of computer instructions may include a function called by the plurality of computer instructions, display, in the virtual environment, a debugging platform of an integrated development environment, the debugging platform configured to receive the plurality of computer instructions and receive input from at least one of the plurality of users, and initiate a debugging protocol in the debugging platform, wherein the debugging protocol may include a breakpoint in at least one of the plurality of computer instructions, wherein the breakpoint is received as an input from the at least one of the plurality of users.

In some embodiments, the at least one processing device may be further configured to receive verbal commands for controlling the debugging platform, wherein the verbal commands are processed using a natural language model, and wherein the verbal commands are configured to at least one of: initiate the debugging protocol, pause the debugging protocol, terminate the debugging protocol, insert the breakpoint, and remove a breakpoint, render at least one stack in the debugging platform, wherein each of the at least one stack may include values of the function called by the plurality of computer instructions, wherein the at least one stack is configured to change color as a result of a flow, and receive revision inputs to the at least one of the plurality of computer instructions in the virtual environment from at least one of the plurality of users.

In some embodiments, the at least one processing device is further configured to render an animated diagram of the flow from a program call hierarchy of the plurality of computer instructions, wherein the animated diagram of the flow may include a time-sequenced graphical representation of a plurality of nodes for the flow, wherein each of the plurality of nodes corresponds to at least one of (i) a stack frame of the plurality of computer instructions, and (ii) a program associated with one of the computer instructions, and export the animated diagram of the flow as a multimedia object.

In some embodiments, the at least one processing device is further configured to receive from each of the plurality of users a selection of physical traits, assign the selection of physical traits to a graphical rendering of each of the plurality of users, associate the corresponding graphical rendering to each of the plurality of users, and store the graphical rendering of the each of the plurality of users in the at least one non-transitory storage device.

In some embodiments, the revision inputs are additional verbal commands processed using the natural language model.

In some embodiments, each of the at least one stack further may include a timestamp.

In some embodiments, the virtual environment is a multi-dimensional virtual reality configured to allow a plurality of users to interact with the integrated development environment.

In another aspect, a computer program product for implementing a code debugger platform in a virtual environment is presented. The computer program product may include a non-transitory computer-readable medium may include code causing a first apparatus to authenticate a plurality of users via an authentication portal, initialize an instance of a virtual environment for each of the plurality of users, extract, from the at least one non-transitory storage device, a plurality of computer instructions, wherein the plurality of computer instructions may include interconnectivity therebetween, and wherein the plurality of computer instructions may include a function called by the plurality of computer instructions, display, in the virtual environment, a debugging platform of an integrated development environment, the debugging platform configured to receive the plurality of computer instructions and receive input from at least one of the plurality of users, and initiate a debugging protocol in the debugging platform, wherein the debugging protocol may include a breakpoint in at least one of the plurality of computer instructions, wherein the breakpoint is received as an input from the at least one of the plurality of users.

In yet another aspect, a method for implementing a code debugger platform in a virtual environment is presented. The method may include authenticating a plurality of users via an authentication portal, initializing an instance of a virtual environment for each of the plurality of users, extracting, from the at least one non-transitory storage device, a plurality of computer instructions, wherein the plurality of computer instructions may include interconnectivity therebetween, and wherein the plurality of computer instructions may include a function called by the plurality of computer instructions, displaying, in the virtual environment, a debugging platform of an integrated development environment, the debugging platform configured to receive the plurality of computer instructions and receive input from at least one of the plurality of users, and initiating a debugging protocol in the debugging platform, wherein the debugging protocol may include a breakpoint in at least one of the plurality of computer instructions, wherein the breakpoint is received as an input from the at least one of the plurality of users.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

The technology described herein implements a debugging program in a virtual environment, such that multiple users can debug, at the same time, discrete portions of computer code that are dependent on one other. For example, one user is able to debug portions of computer code associated with the front end of an application, while another user is able to debug portions of computer code associated with the back end of an application. Furthermore, the technology described herein provides for visualization of process flow between or within computer code to provide a user with a visual way to analyze the debugging. Moreover, the technology described herein implements natural language processing and speech recognition engines to allow users to navigate, amend, and otherwise direct the debugging process within the virtual environment.

Prior to the invention described herein, there was no ideal way to debug multiple portions of computer code within the same environment with multiple users. Traditionally, users would be required to each take computer code that contained unknown errors, debug them separately on their own endpoint devices, and then test the overall application that may refer to these separately-debugged portions of code. This leads to an unnecessary expenditure of resources, unintentional duplication of efforts by the users providing the debugging, and an unclear visualization of how components of computer code interact with one another across an entity. By allowing multiple users to debug portions of code simultaneously, problems within the computer code can be solved quickly and thereby reduce downtime, speed up the implementation of new developments, and so forth.

The present disclosure provides for the implementing a code debugger platform in a virtual environment. The system authenticates users through an authentication portal, and then initialize instances of a multi-dimensional virtual environment for each of the users. The system may then assign avatars to each user. The system retrieves computer code which has interconnectivity with other computer code which the system retrieves. The system displays, in the virtual environment, a debugging platform, where the debugging platform is capable of receiving the computer code and input from the users. The system then initiates a debugging protocol including a breakpoint in the computer code provided by the users. The system then receives verbal commands for controlling the debugging via the debugging platform, where the verbal commands are provided by a user and a natural language model interprets the verbal commands and thereafter performs the verbal commands based on the commands provided. Stacks are rendered by the system in the debugging platform, and the color of stack is changed as a result of flow. The system further renders an animated flow diagram from the program call hierarchy of the computer code, representing as nodes either the stack frame or individual programs. The system then exports and saves the animated flow diagram.

What is more, the present invention provides a technical solution to a technical problem. As described herein, the technical problem includes the inability for multiple users to debug computer instructions at the same time, especially if the computer instructions contain functions or calls to other computer instructions that also need to be debugged at the same time. The technical solution presented herein allows for multiple users to work together in a virtual environment to debug computer instructions that are interconnected. In particular, the system is an improvement over existing debugging systems by allowing the debugging of computer code (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

Figure 1A:
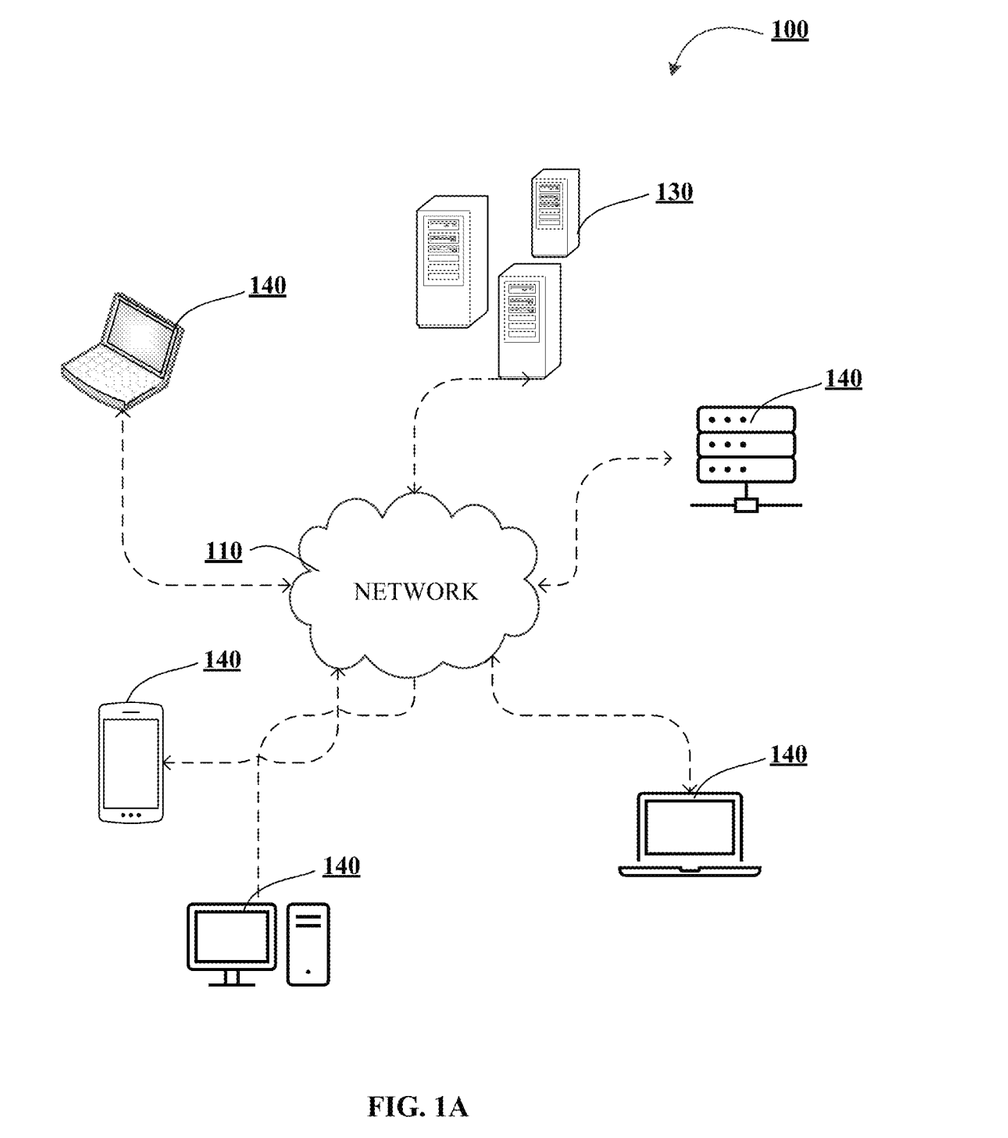
FIGS. 1A-1C illustrate technical components of an exemplary distributed computing environment for implementing a code debugger platform in a virtual environment, in accordance with an embodiment of the invention.
Figure 1B:
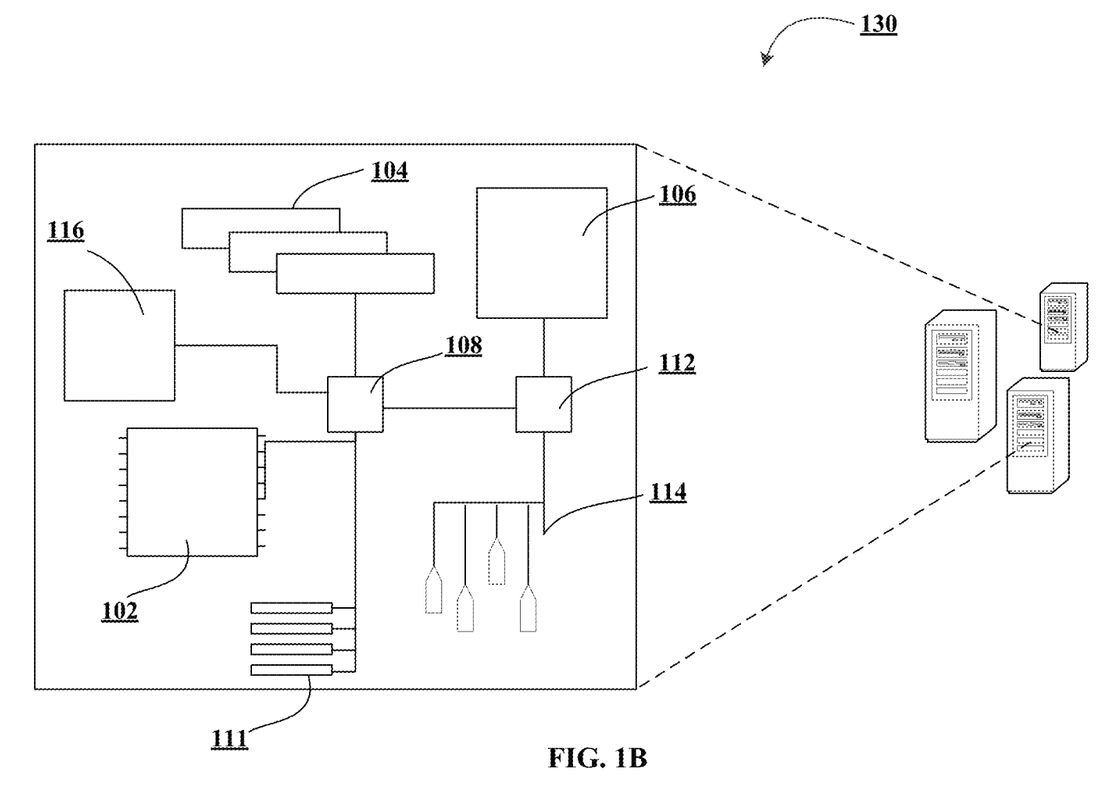
Figure 1C:
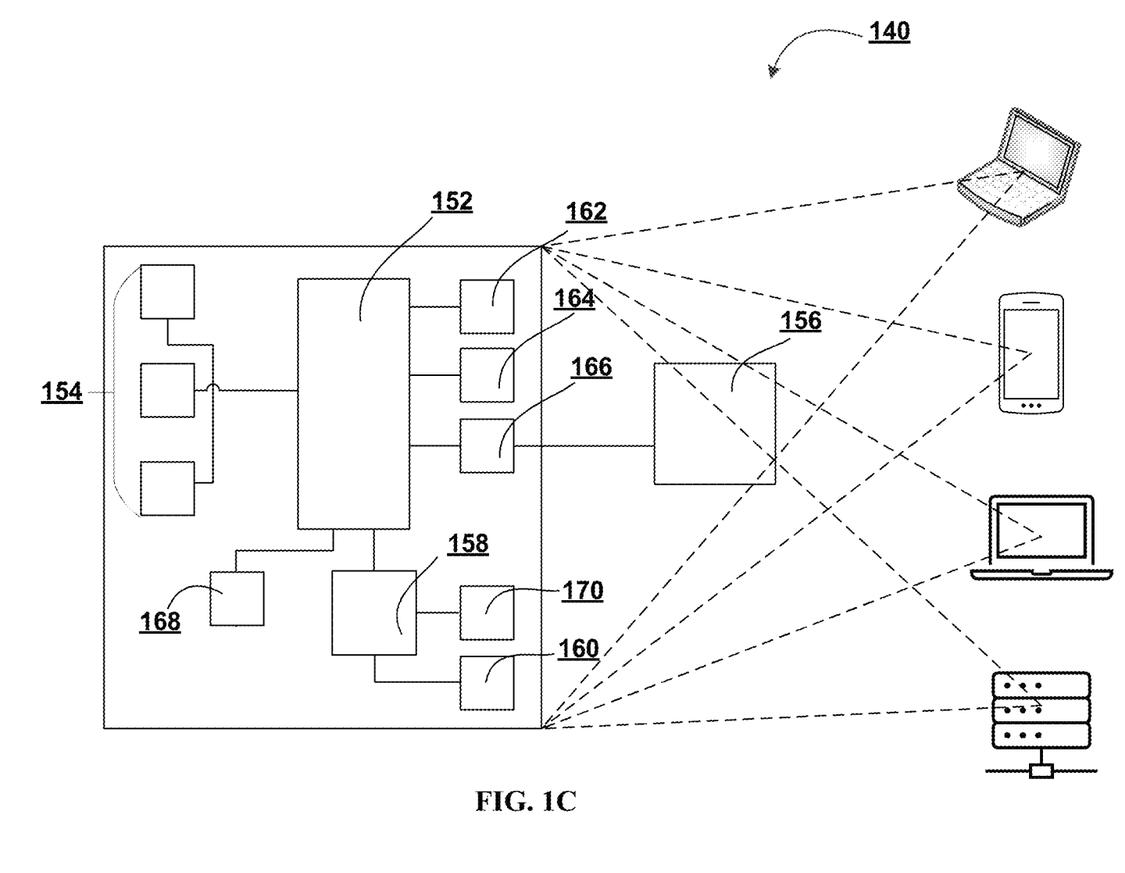

FIGS. 1A-1C illustrate technical components of an exemplary distributed computing environment 100 for implementing a code debugger platform in a virtual environment, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory engine) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

Figure 2:
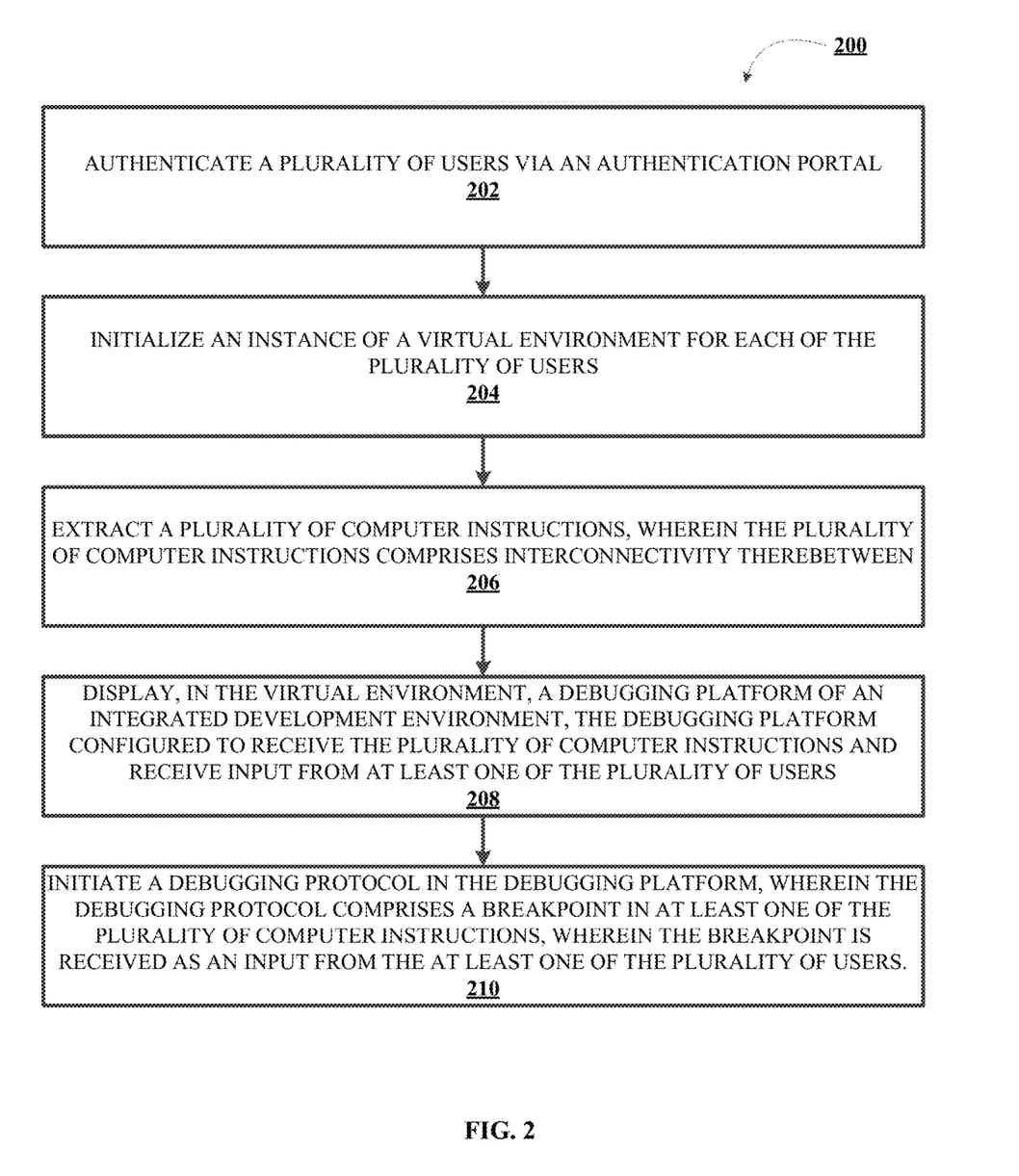
FIG. 2 illustrates a process flow for implementing a code debugger platform in a virtual environment, in accordance with an embodiment of the invention.

FIG. 2 illustrates a process flow 200 for implementing a code debugger platform in a virtual environment, in accordance with an embodiment of the invention. The process may begin at block 202. A user accesses the code debugger platform of the system 130 via an endpoint device 140, the user may be provided with an authentication portal to provide authentication credentials. In some embodiments of the inventions, a plurality of users will provide authentication credentials to a plurality of endpoint devices 140, each endpoint device 140 corresponding to each of the plurality of users. The authentication credentials may include a username or email address, along with a corresponding password. The system 130 receives the authentication credentials from each of the plurality of users and thereafter authenticates the authentication credentials by comparing the authentication credentials for each of the plurality of users to those stored in an authentication server.

The process may then continue at block 204, where the system 130 initializes an instance of a virtual environment for each of the plurality of users. A virtual environment may be a multi-dimensional virtual reality or augmented reality platform within the system 130 (e.g., the "metaverse"), configured to be interacted with by a user or plurality of users through an endpoint device 140 or plurality of endpoint devices 140. In some embodiments the user or each of the plurality of users may interact with the virtual environment through a user interface of the endpoint device(s) 140, such as a screen or monitor. In other embodiments, the user or each of the plurality of users may interact with the virtual environment with specialized interaction hardware headsets with virtual reality ("VR") headsets, smart glasses, or augmented reality ("AR") glasses. In some embodiments, the specialized interaction hardware headsets may include one or more microphone devices structured to receive analog voice signals from the user and convert the analog voice signals into digital sound data. In some embodiments, the virtual environment is a multi-dimensional virtual reality configured to allow a plurality of users to interact with the integrated development environment.

In some embodiments, the system 130 is configured to receive from each of the plurality of users a selection of physical traits, such as to create an "avatar" for the user as an identifier of the user to other users within the virtual environment. After being authenticated, a user may be presented with a generic animated depiction of a human and be provided with selection boxes for physical traits such as eye color, hair color, height, or the like. The system 130 may then assign the selection of physical traits to a graphical rendering of the user, where in embodiments where a plurality of users are selecting physical traits, each selection of physical traits by a user corresponds to the graphical rendering rendered by the system 130 for the user. In this way, each user may select an animated depiction of themselves, which serves as an identifier to other uses within the virtual environment. Accordingly, the system 130 may associate the corresponding graphical rendering to each of the plurality of users.

In order to prevent the each user from having to re-select physical traits after each initialization of the instance(es) of the virtual environment, they system 130 may store the graphical rendering of the each of the plurality of users in the at least one non-transitory storage device 106, along with an authentication credential such as a login name or email address.

Continuing at block 206, the system 130 extracts from the at least one non-transitory storage device 106 a plurality of computer instructions. The computer instructions are computer code that the user or plurality of users desire to "debug" or attempt to identify and resolve errors in such computer code. In order to leverage the benefits of the present invention, the plurality of computer instructions may contain interconnectivity therebetween, such that one computer instruction contains functions or variables that reference another computer instruction. The plurality of computer instructions may be associated with one program or application, such that, as one non-limiting example one computer instruction is associated with the "front end" of the application, while another computer instruction is associated with the "back end" of the same application. In other embodiments, each of two or more of the computer instructions may be associated with different applications or programs. In some embodiments, each of the plurality of computer instructions contains a function called by each of the plurality of computer instructions, such that the same function is throughout each of the plurality of computer instructions. In other embodiments, each of the plurality of computer instructions contains independent functions not associated with each of the plurality of computer instructions. In either embodiment, the computer instructions contain a function such that a call stack portion of the debugging platform lists each of the active functions that have been called by each of the plurality of computer instructions up to a specific point of execution. The call stack lists an entry for each function, as well as which line of computer instruction will be returned to when the function returns. When a new function returns to the caller, it is removed from the top of the call stack. In this way, the debugging platform knows where to return by keeping track in the call stack.

The process may continue at block 208, where the system 130 displays, in the virtual environment, the debugging platform of an integrated development environment. It shall be understood that the integrated development environment ("IDE") is a software application providing comprehensive facilities to users for software development. An IDE normally consists of at least one source code editor, a plurality of build automation tools, and a debugger. The debugging platform, which may be referred to as a debug session, of the IDE may be configured to receive the plurality of computer instructions. The debugger platform allows a user to find bugs, or errors in computer instruction, by providing insight into the internal operations of the computer instructions. The debugger platform may be configured to pause the execution of computer instruction and analyze the state of the computer instruction through examination of variables and how each variable changes as a result of the execution of lines of computer instruction. The debugger platform may also be configured to receive breakpoints, which are points in the computer instruction selected by a user at which the debugging (e.g., the line by line execution) is paused. In this way, the user is able to view information regarding variables within the computer instruction at the breakpoint without the program proceeding. The debugger platform, like the rest of the IDE, is configured to receive input from at least one of the plurality of users, such as for the user to stop, start, or pause the execution of the debugging platform, and to receive placement of breakpoints within the computer instructions from the user.

The process continues at block 210, where the system 130 initiates a debugging protocol in the debugging platform. The debugging protocol is the initiation of the debugging portion of the computer instructions associated with the debugging platform in the IDE, which brings each of the plurality of computer instructions into the debugging platform and initiates the execution of the each of the plurality of computer instructions in a line-by-line basis while maintaining and tracking the value of variables of the plurality of computer instructions in the call stack. In some embodiments, each of the plurality of computer instructions is displayed in a separate window of the debugging platform, each with its own debugging protocol. In some embodiments, there may be plurality of call stacks, each associated with a corresponding computer instruction. However, in other embodiments, the call stack may be shared by the plurality of computer instructions. In this way, the variables across all of the computer instructions are combined into a singular call stack for viewing of all computer instructions. As previously described, the debugging platform may stop or pause at a breakpoint which has been assigned by a user within a portion of one or more of the plurality of computer instructions. In some embodiments, the debugging platform may be configured to receive input from a plurality of users to determine the location of breakpoints within at least one of the computer instructions.

Figure 3:
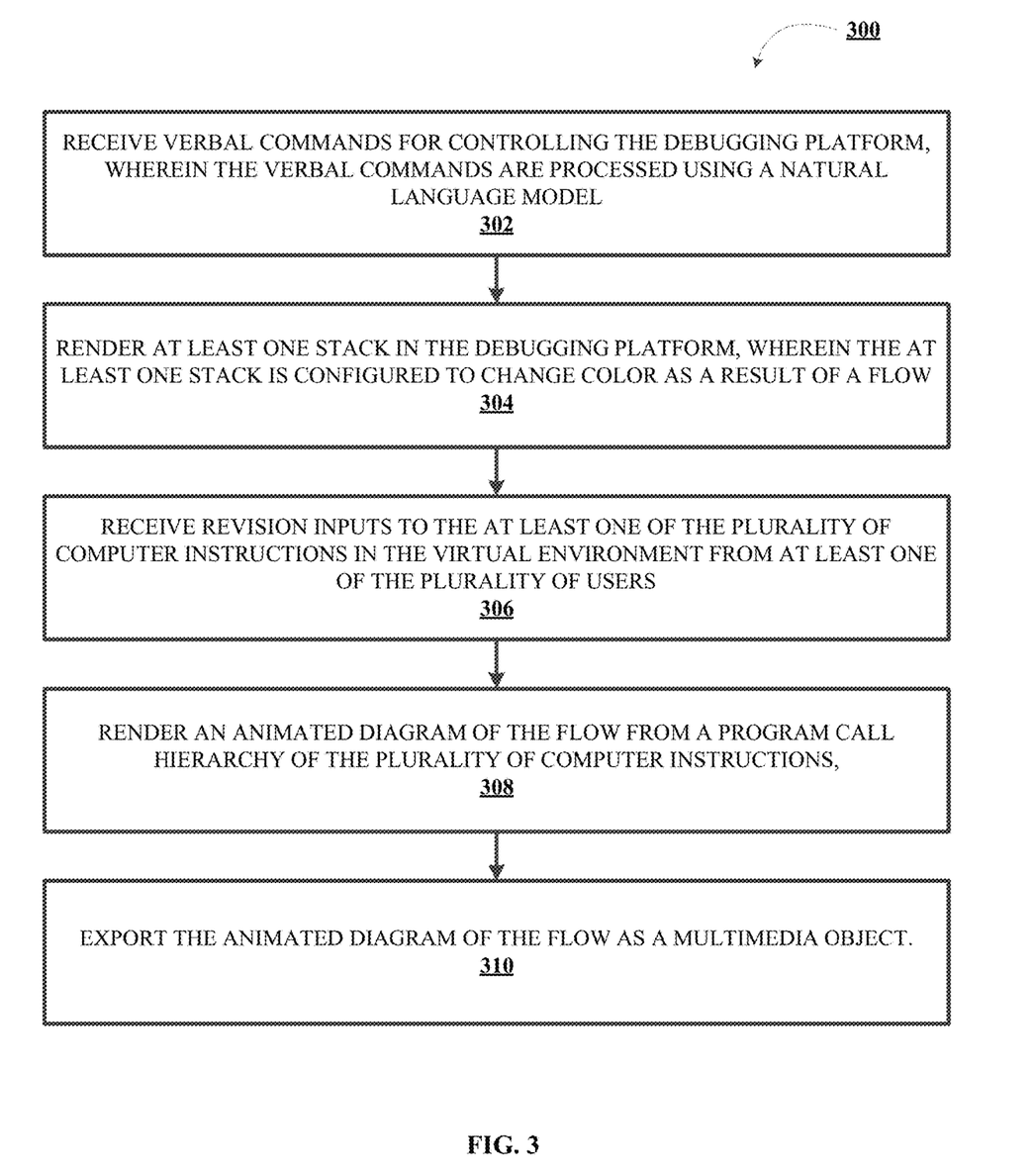
FIG. 3 illustrates a process flow for implementing a code debugger platform in a virtual environment, in accordance with an embodiment of the invention.

FIG. 3 illustrates a process flow 300 for implementing a code debugger platform in a virtual environment, in accordance with an embodiment of the invention. Process flow 300 may occur concurrent with or sequential to process flow 200. The process may begin at block 302, where the system 130 receives verbal commands for controlling the debugging platform. It shall be appreciated that while in a virtual environment, input to traditional mechanisms for communication with computer systems may not be the preferred or most efficient. Therefore, the present system 130, in conjunction with a microphone of one or more endpoint device 140, receives verbal (e.g., spoken) commands. The system 130 receives such commands which are then processed using a natural language model, the natural language model structured to perform natural language processing ("NLP") of the plurality of computer instructions and a voice transcription (e.g., speech to text) of the verbal commands received at the endpoint device 140. The verbal commands are provided by at least one of a plurality of user, and subsequent a receiving of the verbal commands in the natural language model, the system 130 is configured initiate the debugging protocol, pause the debugging protocol, terminate the debugging protocol, insert the breakpoint, and/or remove a breakpoint.

The process continues at block 304, where the system 130 renders at least one stack, otherwise known as a call stack, in the debugging platform. As previously described in detail with respect to FIG. 2, each of the at least one stack comprises values of the function called by the plurality of computer instructions. The values of the functions called by the plurality of computer instructions may change as a results of each line of computer instruction executed in the debugging platform, thus one or more users can visibly see the value of each function and/or variables therein throughout the code execution. In some embodiments, the at least one stack is configured to change color as a result of a flow, which provides users with a graphical representation of the interconnectivity between computer instructions that are separate and distinct, yet contain one or more references to one another, thus creating interconnectivity. In some embodiments, each variable and/or function within the stack may be configured to changed color as a result of flow. Several color change mechanisms may be implemented which render the stack or functions/variables therein in different colors depending on flow. As one non-limiting example, when a stack or functions/variables therein changes value as a result of computer instructions external to the instant computer instruction as viewed in the code debugger platform, the shade of color may darken by a predetermined percentage, or may move incrementally a predetermined amount from one point of the visible light spectrum (red, orange, yellow, green, blue, indigo, violet) to another. In some embodiments, the system 130 may be configured to receive color-coding from a user for a stack or functions/variables therein, and the color selected by a user is replicated for the corresponding stack or functions/variables therein (e.g., the shared components of computer instruction) across each of the computer instructions. In some embodiments, each of the at least one stack further comprises a timestamp, such that a timestamp may be appended to each of the at least one stack upon starting/stopping/pausing the execution of the computer instruction in the debugging platform. In some embodiments, each time a function is called or variable is changed within each of the at least one call stack, a timestamp is appended such that a user can determine how long it takes for each portion of the computer instruction to execute.

The process may continue at block 306, wherein the system 130 receives revision inputs to the at least one of the plurality of computer instructions in the virtual environment from at least one of the plurality of users. It shall be appreciated that although it is useful for the user to determine errors in the computer instruction(s), one of the benefits of the debugging platform is that the debugging process can be repeated after portions of the computer instruction(s) have been amended by at least one user. Thus, the present system 130 is configured to receive revisions via revision inputs to the computer instruction in a session window of the IDE and reflect such revisions in the debugging platform. In some embodiments, the revisions are received as revision inputs are additional verbal commands processed using the natural language model, the same way as those in block 302.

The process continues at block 308, where they system 130 renders an animated diagram of the flow from a program call hierarchy of the plurality of computer instructions. It shall be appreciated that for continuity within an entity, the viewing and sharing of animated diagrams is a beneficial method for sharing lessons-learned and or technical solutions to problems that other users within the entity may face. As such, a diagram of the flow (e.g., a program call hierarchy, or flow diagram) between each of the nodes referenced by the plurality of computer instructions provided to the debugging platform may be generated. For example, computer instruction(s) may refer to multiple applications, and as such a flow diagram may present each program associated with the computer instruction(s) as a node, with an input and/or output arrow being directed into or out of each node, and each input and/or output arrow being directed to one or more additional nodes. In some embodiments, each of the nodes is represented as a stack frame of the computer instructions in the debugging platform, where for a call stack, the stack frame represents a function call and its argument data. In this way, the flow diagram represents a higher resolution of process flow of the computer instructions. In some embodiments, the debugging platform displays the line of the computer instruction that is making the call and the flow diagram is updated to display this part of the stack trace from the calling program.

In some embodiments, the computer instructions comprise a time-sequenced graphical representation of a plurality of nodes, throughout the execution of the plurality of computer instructions, the flow diagram (e.g., diagram of the flow) is rendered. By rendering at a predetermined time interval, still images of the flow diagram can be stitched together to form an animation. A user is able to start, stop, pause, rewind, and fast forward the animation, and visually see how nodes change throughout the execution of the computer instruction(s).

The process may continue at block 310 where they system 130 exports the animated diagram of the flow as a multimedia object. The multimedia object may be any video-capable format, including but not limited to: MP4, MOV, WMV, FLV, AVI, AVCHD (Advanced Video Coding High Definition), WebM, MKV, or the like, and as such the system 130 may compress, encode, or otherwise structure the animated diagram of the flow to export such multimedia object. Thereafter, the multimedia object may be stored in a storage device 106 of the system 130.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing a code debugger platform in a virtual environment, the system comprising:
at least one non-transitory storage device; and
at least one processing device coupled to the at least one non-transitory storage device, wherein the at least one processing device is configured to:
authenticate a plurality of users via an authentication portal;
for each authenticated user, initialize an instance of a virtual environment; and
in response to the initialization of an instance of a virtual environment for a first authenticated user, performing the steps of:
automatically extract, within the instance of the virtual environment for the first authenticated user, from a non-transitory storage medium, a plurality of computer instructions, wherein the plurality of computer instructions comprises interconnectivity of front end and back end functions that are called therebetween for debugging;
automatically extract an input associated with the first authenticated user stored in the non-transitory storage medium;
automatically display, in the virtual environment for the first authenticated user, a debugging platform of an integrated development environment; and
configure a debugging protocol in the debugging platform, wherein the debugging protocol performs a breakpoint in at least one of the plurality of computer instructions based on the extracted input.

2. The system of claim 1, wherein the at least one processing device is further configured to:
receive verbal commands for controlling the debugging platform, wherein the verbal commands are processed using a natural language model, and wherein the verbal commands are configured to at least one of: initiate the debugging protocol, pause the debugging protocol, terminate the debugging protocol, insert the breakpoint, and remove a breakpoint;
render at least one stack in the debugging platform, wherein each of the at least one stack comprises values of the front end and the back end functions called by the plurality of computer instructions, wherein the at least one stack is configured to change color as a result of a flow; and
receive revision inputs to the at least one of the plurality of computer instructions in the virtual environment from at least one of the plurality of users.

3. The system of claim 2, wherein the at least one processing device is further configured to:
render an animated diagram of the flow from a program call hierarchy of the plurality of computer instructions, wherein the animated diagram of the flow comprises a time-sequenced graphical representation of a plurality of nodes for the flow, wherein each of the plurality of nodes corresponds to at least one of (i) a stack frame of the plurality of computer instructions, and (ii) a program associated with one of the computer instructions; and
export the animated diagram of the flow as a multimedia object.

4. The system of claim 1, wherein the at least one processing device is further configured to:
receive from each of the plurality of users a selection of physical traits;
assign the selection of physical traits to a graphical rendering of each of the plurality of users;
associate the corresponding graphical rendering to each of the plurality of users; and
store the graphical rendering of the each of the plurality of users in the non-transitory storage medium.

5. The system of claim 2, wherein the revision inputs are additional verbal commands processed using the natural language model.

6. The system of claim 2, wherein each of the at least one stack further comprises a timestamp.

7. The system of claim 1, wherein the virtual environment is a multi-dimensional virtual reality configured to allow a plurality of users to interact with the integrated development environment.

8. A computer program product for implementing a code debugger platform in a virtual environment, the computer program product comprising a non-transitory computer-readable medium comprising code causing a first apparatus to:
authenticate a plurality of users via an authentication portal;
for each authenticated user, initialize an instance of a virtual environment; and
in response to the initialization of an instance of a virtual environment for a first authenticated user, performing the steps of:
automatically extract within the instance of the virtual environment for the first authenticated user, from a non-transitory storage medium, a plurality of computer instructions, wherein the plurality of computer instructions comprises interconnectivity of front end and back end functions that are called therebetween for debugging;

automatically extract an input associated with the first authenticated user stored in the non-transitory storage medium;

automatically display, in the virtual environment for the first authenticated user, a debugging platform of an integrated development environment; and configure a debugging protocol in the debugging platform, wherein the debugging protocol performs a breakpoint in at least one of the plurality of computer instructions based on the extracted input.

9. The computer program product of claim 8, wherein the code further causes the first apparatus to:

receive verbal commands for controlling the debugging platform, wherein the verbal commands are processed using a natural language model, and wherein the verbal commands are configured to at least one of: initiate the debugging protocol, pause the debugging protocol, terminate the debugging protocol, insert the breakpoint, and remove a breakpoint;

render at least one stack in the debugging platform, wherein each of the at least one stack comprises values of the front end and the back end functions called by the plurality of computer instructions, wherein the at least one stack is configured to change color as a result of a flow; and receive revision inputs to the at least one of the plurality of computer instructions in the virtual environment from at least one of the plurality of users.

10. The computer program product of claim 9 wherein the code further causes the first apparatus to:

render an animated diagram of the flow from a program call hierarchy of the plurality of computer instructions, wherein the animated diagram of the flow comprises a time-sequenced graphical representation of a plurality of nodes for the flow, wherein each of the plurality of nodes corresponds to at least one of (i) a stack frame of the plurality of computer instructions, and (ii) a program associated with one of the computer instructions; and export the animated diagram of the flow as a multimedia object.

11. The computer program product of claim 8, wherein the code further causes the first apparatus to:

receive from each of the plurality of users a selection of physical traits;

assign the selection of physical traits to a graphical rendering of each of the plurality of users;

associate the corresponding graphical rendering to each of the plurality of users; and store the graphical rendering of the each of the plurality of users in the non-transitory storage medium.

12. The computer program product of claim 9, wherein the revision inputs are additional verbal commands processed using the natural language model.

13. The computer program product of claim 9, wherein each of the at least one stack further comprises a timestamp.

14. The computer program product of claim 8, wherein the virtual environment is a multi-dimensional virtual reality configured to allow a plurality of users to interact with the integrated development environment.

15. A computer-implemented method for implementing a code debugger platform in a virtual environment, the method is executed by one or more computing processor devices and comprises:

authenticating a plurality of users via an authentication portal;

for each authenticated user, initializing an instance of a virtual environment; and in response to the initialization of an instance of a virtual environment for a first authenticated user, performing the steps of:

automatically extracting, within the instance of the virtual environment for the first authenticated user, from a non-transitory storage medium, a plurality of computer instructions, wherein the plurality of computer instructions comprises interconnectivity of front end and back end functions that are called therebetween for debugging;

automatically extracting an input associated with the first authenticated user stored in the non-transitory storage medium;

automatically displaying, in the virtual environment for the first authenticated user, a debugging platform of an integrated development environment; and configuring a debugging protocol in the debugging platform, wherein the debugging protocol performs a breakpoint in at least one of the plurality of computer instructions based on the extracted input.

16. The computer-implemented method of claim 15, further comprising:

receiving verbal commands for controlling the debugging platform, wherein the verbal commands are processed using a natural language model, and wherein the verbal commands are configured to at least one of: initiate the debugging protocol, pause the debugging protocol, terminate the debugging protocol, insert the breakpoint, and remove a breakpoint;

rendering at least one stack in the debugging platform, wherein each of the at least one stack comprises values of the front end and the back end functions called by the plurality of computer instructions, wherein the at least one stack is configured to change color as a result of a flow; and receiving revision inputs to the at least one of the plurality of computer instructions in the virtual environment from at least one of the plurality of users.

17. The computer-implemented method of claim 16, further comprising:

rendering an animated diagram of the flow from a program call hierarchy of the plurality of computer instructions, wherein the animated diagram of the flow comprises a time-sequenced graphical representation of a plurality of nodes for the flow, wherein each of the plurality of nodes corresponds to at least one of (i) a stack frame of the plurality of computer instructions, and (ii) a program associated with one of the computer instructions; and exporting the animated diagram of the flow as a multimedia object.

18. The computer-implemented method of claim 15, further comprising:

receiving from each of the plurality of users a selection of physical traits;

assigning the selection of physical traits to a graphical rendering of each of the plurality of users;

associating the corresponding graphical rendering to each of the plurality of users; and storing the graphical rendering of the each of the plurality of users in the non-transitory storage medium.

19. The computer-implemented method of claim 16, wherein the revision inputs are additional verbal commands processed using the natural language model.

20. The computer-implemented method of claim 15, wherein the virtual environment is a multi-dimensional virtual reality configured to allow a plurality of users to interact with the integrated development environment.

* * * * *